Nov. 1, 1938.   A. FINESTONE   2,135,001
FUEL HEATING AND VAPORIZING SYSTEM FOR INTERNAL COMBUSTION ENGINES
Filed Dec. 24, 1937   3 Sheets-Sheet 1
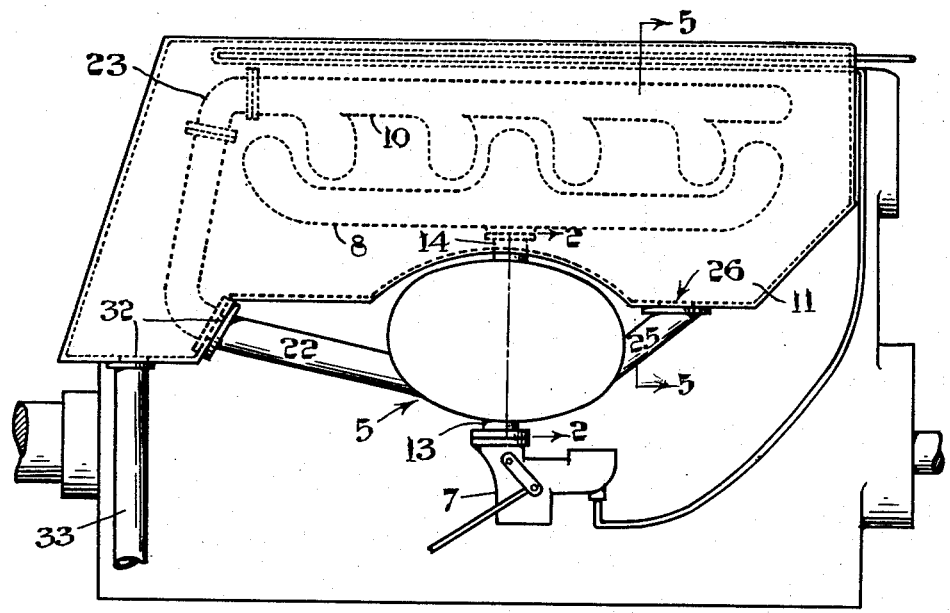
FIG. 1
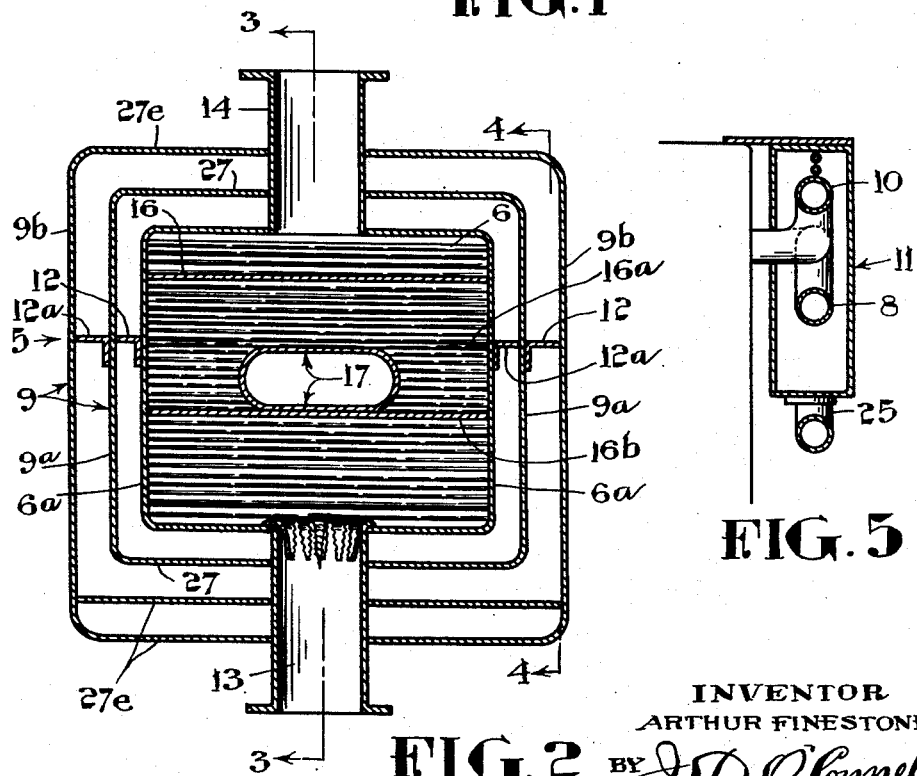
FIG. 2
FIG. 5
INVENTOR
ARTHUR FINESTONE
BY J. D. O'Connell
ATTORNEY

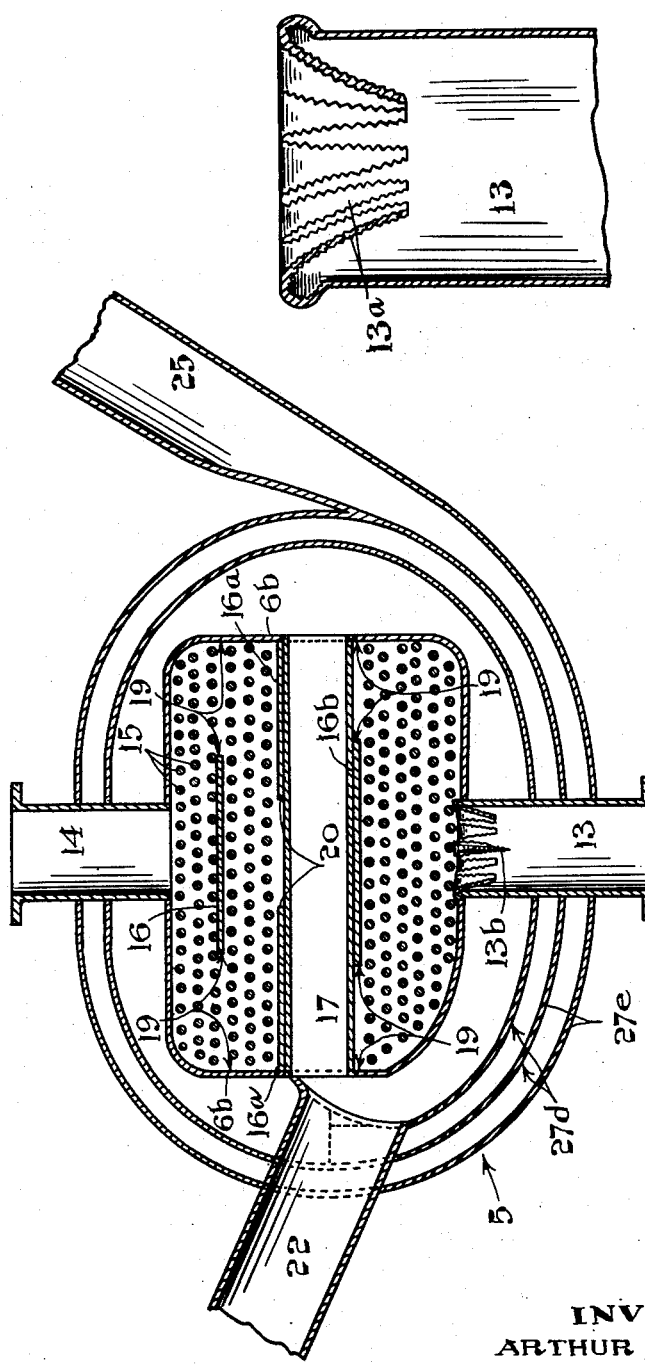

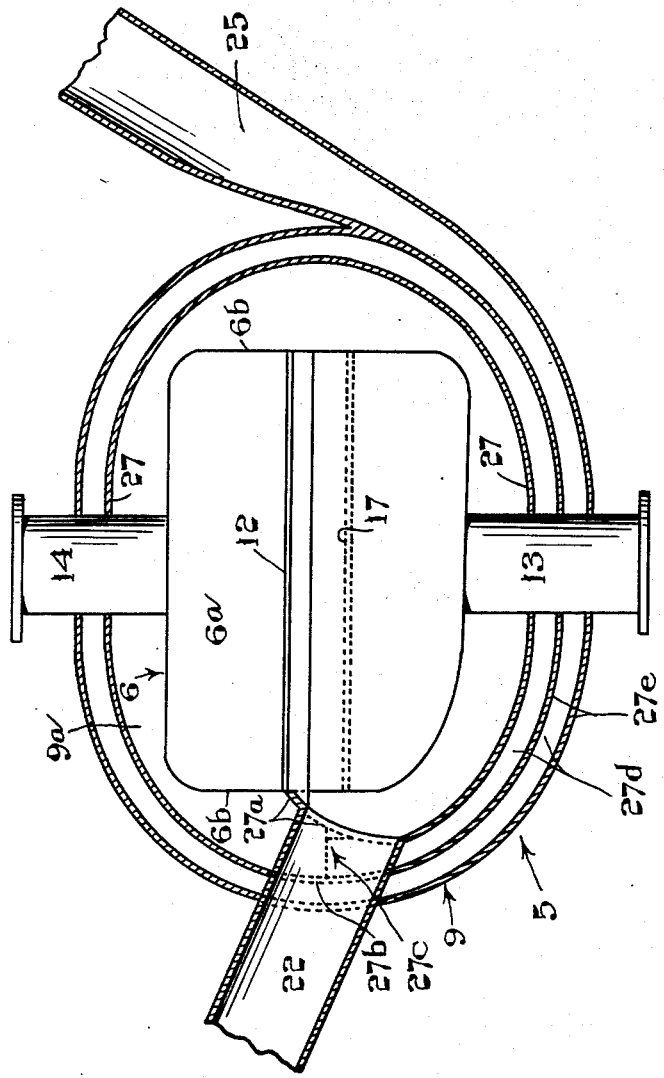

Patented Nov. 1, 1938

2,135,001

UNITED STATES PATENT OFFICE 2,135,001

FUEL HEATING AND VAPORIZING SYSTEM FOR INTERNAL COMBUSTION ENGINES

Arthur Finestone, Montreal, Quebec, Canada

Application December 24, 1937, Serial No. 181,589

10 Claims. (Cl. 123—122)

This invention relates to fuel heating and vaporizing systems for internal combustion engines; and it comprises a system wherein the fuel is efficiently vaporized by indirect heat interchange with exhaust gases during passage of the latter through a fuel vaporizer connected between the carbureter and the intake manifold and through a manifold heater enclosing both the intake and the exhaust manifolds.

The vaporizer includes a fuel vaporizing chamber through which the fuel passes to the intake manifold. This chamber is provided with a multiplicity of heat conducting elements in the path of fuel flow and is surrounded by a heater casing through which exhaust gases are passed directly from the outlet of the exhaust manifold. In flowing through the heater casing of the vaporizer the exhaust gases are passed and re-passed around the vaporizing chamber so that the heat energy of the gases is efficiently utilized to effect rapid and substantially complete vaporization of the fuel. The gases are conducted from the heater casing of the vaporizer to the manifold heater where they come in direct contact with both manifolds and serve principally to heat the intake manifold to prevent cooling and condensation of the vaporous fuel supplied thereto. The manifold heater is provided with an outlet through which the gases are passed into a suitable exhaust pipe. By utilizing the exhaust gases to heat both the vaporizer and the intake manifold in the particular manner characteristic of this invention I provide a highly efficient vaporizing system which enables heavier oils and distillates to be used as fuel instead of gasoline.

An important feature of the invention consists in the particular manner in which the vaporizer is constructed so that the hot gases are passed and re-passed around the vaporizing chamber to extract the maximum amount of heat before the gases pass to the manifold heater.

Another feature resides in the provision of a novel arrangement of baffles whereby the fuel passing through the vaporizing chamber of the vaporizer is brought in contact with all the heat conducting elements contained in said chamber.

A further feature consists in passing the heavy oil or distillate to the carbureter and vaporizer of the engine through a pre-heating coil which is located in the manifold heater casing to be heated by the exhaust gases passing therethrough.

Proceeding now to a more detailed description reference will be had to the accompanying drawings, in which—

Fig. 1 is an elevational view of an engine equipped with a fuel heating and vaporizing system designed in accordance with the principles of this invention.

Fig. 2 is a transverse sectional view of a vaporizing unit shown in Fig. 1, the plane of the section being substantially along the line 2—2 of Fig. 1.

Fig. 3 is a transverse sectional view taken substantially along the line 3—3 of Fig. 2.

Fig. 4 is a longitudinal sectional view taken substantially along the line 4—4 of Fig. 2.

Fig. 5 is a transverse sectional view of the manifold heater appearing in Fig. 1, the plane of the section being substantially along the line 5—5 of Fig. 1.

Fig. 6 is a fragmentary vertical sectional view of a portion of the inlet through which fuel is supplied to the vaporizing chamber.

In these drawings the primary vaporizing unit of my improved fuel heating and vaporizing system is generally indicated at 5. As shown more particularly in Figs. 2 and 3, it comprises an inner fuel vaporizing chamber 6 through which fuel is passed from the carbureter 7 to the intake manifold 8; and an outer heater casing 9 through which exhaust gases are passed from the exhaust manifold 10 to the manifold heater 11.

In the present instance vaporizing chamber 6 is shown as a rectangular sheet metal casing supported between the side walls 9a of the heater casing 9 by suitable angle irons 12. This chamber is provided with an inlet 13 connected to the carbureter 7 and an outlet 14 connected to the intake manifold 8. It is also provided with a plurality of heat conducting elements 15, flow directing baffles 16, 16a and 16b, and an exhaust-gas flue 17. The heat conducting elements 15 are shown as solid metal rods extending between and supported by the side walls 6a of chamber 6. It is obvious, however, that other forms such as plates or tubes may be used instead of solid rods. The baffles 16, 16a and 16b are arranged, as shown in Figs. 2 and 3, to provide a tortuous flow passage through which the fuel is guided so that, in passing from the inlet 13 to the outlet 14, it is brought in direct contact with all of the heat conducting elements 15. In this connection it will be noted that the upper and lower baffles 16 and 16b extend transversely across the full width of the central portion of chamber 6 and have their longitudinal edges spaced from the end walls 6b of said chamber to provide intervening flow passages 19. The intermediate baffles 16a are supported on the end portions of the flue 17 and also extend across the full width of the chamber 6. The outer longitudinal edges of baffies 16a abut the end walls of chamber 6 and are preferably secured thereto. The inner longitudinal edges of baffles 16a are spaced apart to provide an intervening flow passage 20. The baffle 16 is preferably welded to overlying heat conducting elements 15 while the baffles 16a and 16b are preferably welded to the longitudinal flue 17 which has its opposite open ends supported in suitable openings 21 provided in the end walls of chamber 6.

The heater casing 9 is provided with a gas inlet 22 connected to the outlet end 23 of the exhaust manifold 10 and a gas outlet 25 connected to the gas inlet opening 26 of the manifold heater 11. The side walls 9a of casing 9 are joined together by a volute wall 27 to form an inner casing portion in which chamber 6 is supported by the angles 12. The wall 27 is spaced from chamber 6 except at the end 27a which is bent inwardly and secured to the adjacent end wall of chamber 6 in line with the horizontal flanges of the angles 12. The remaining end 27b of wall 27 overlies the end 27a and is spaced therefrom, as shown in Fig. 4, to provide an outlet 27c. The two ends 27a and 27b of wall 27 are slotted to fit around the inlet 22 to which they are welded or otherwise secured to make a tight joint. In traversing the volute passage formed by the wall 27 the gases admitted through inlet 22 first flow rearwardly along the side and bottom portions of chamber 6 which lie below the angles 12. As these gases reach the ends of angles 12 remote from inlet 22 their direction of flow is reversed and they then pass forwardly to the outlet 27c in contact with that portion of chamber 6 which lies above the angles 12. As they pass through the outlet 27c the gases enter a second passage 27d formed by a volute wall 27e which is arranged to form a continuation of the wall 27 and is secured between the outer side plates 9b of casing 9. After being re-passed around the chamber 6 through the passage 27a, the gases are discharged through the outlet 25 into the heater casing 11. It will thus be seen that the gases, in passing from the inlet 22 to the outlet 25, are caused to make two and a half circuits around the fuel vaporizing chamber 6 so that the heat energy of the gases is efficiently utilized for vaporizing the fuel passing through said chamber. The side walls 9b of casing 9 are supported from the side walls 9a by angles 12a.

As shown more particularly in Figures 1 and 5, the manifold heater 11 comprises a sheet metal casing completely enclosing both the intake manifold 8 and the exhaust manifold 10. The gases entering this casing through the gas inlet opening 26 flow along the length of the casing in direct contact with both manifolds and are eventually discharged through an outlet 32 connected to an exhaust pipe 33. In passing through the casing 11 the gases serve to heat the manifold 8 to prevent cooling and condensation of the vaporous products delivered to the manifold through the outlet 14 of the fuel vaporizing unit 5.

The supply line 34, through which fuel is supplied to the carbureter 7, is preferably provided with a pre-heating coil 34 located within the manifold heater casing 11. With this arrangement the fuel, in passing through the pre-heating coil 34, is heated by indirect heat interchange with the exhaust gases flowing through the casing 11 and is thus raised to a temperature which facilitates substantially complete vaporization of the fuel during its passage through the vaporizer 5 and the intake manifold 8. When the fuel used is heavy oil or distillate the engine will preferably be provided with a suitable priming system through which gasoline may be introduced into the manifold 8 or directly into the engine cylinders for starting purposes.

The fuel inlet 13 comprises a pipe having its inner end slit to provide a plurality of tongues 13a which are bent to extend from the inner toward the outer end of the pipe. As shown in Figs. 3 and 6, these tongues 13a encircle a central post 13b which may consist of an ordinary wood screw having its head welded or otherwise secured to one of the heating elements 15. The tongues 13a and post, or screw 13b, are highly heated by the exhaust gases and assist in breaking up and vaporizing the fuel entering the chamber 6.

Having thus described my invention, what I claim is:—

1. A fuel heating and vaporizing system for internal combustion engines comprising a casing enclosing the intake manifold, a vaporizing chamber through which fuel is passed to said manifold and means for conducting hot gases from the exhaust manifold of the engine into heat interchanging contact with the walls of said chamber and then passing said gases through said casing in heat interchanging contact with the intake manifold.

2. A fuel heating and vaporizing system as claimed in claim 1 in which the last mentioned means comprises a vaporizer heating casing enclosing said vaporizing chamber, said casing having a gas inlet connected to the exhaust manifold and a gas outlet connected to the casing enclosing the intake manifold.

3. A fuel heating and vaporizing system as claimed in claim 1 including a pre-heating coil through which fuel is supplied to said vaporizing chamber, said coil being located in the enclosing casing of the intake manifold to be heated by the exhaust gases passing through said casing.

4. A fuel heating and vaporizing system for internal combustion engines comprising a vaporizing chamber through which fuel is passed to the intake manifold, a casing enclosing said vaporizing chamber and provided with a gas inlet connected to the exhaust manifold of the engine, said casing being provided with a gas outlet and being internally partitioned so that the gas, in flowing from the inlet to the outlet of said casing, is passed and re-passed around the vaporizing chamber.

5. A fuel heating and vaporizing system for internal combustion engines comprising a casing enclosing the intake manifold, a second casing having a gas inlet connected to the exhaust manifold of the engine and a gas outlet connected to a gas inlet provided in the casing enclosing the intake manifold, a fuel vaporizing chamber arranged in the second casing to be heated by the exhaust gases flowing therethrough, said chamber being provided with an inlet for the admission of fuel and an outlet through which the vaporized fuel is delivered to the intake manifold, heat conducting elements arranged in said chamber and baffles arranged so that the fuel flowing from the inlet to the outlet of said chamber is guided into contact with all of said heat conducting elements.

6. A fuel heating and vaporizing system for internal combustion engines comprising a fuel vaporizing chamber through which the fuel is passed to the intake manifold of the engine, said chamber being provided with a bottom inlet opening for the admission of fuel and a top outlet opening through which the fuel is passed to the intake manifold, a plurality of heat conducting elements extending across said chamber between the inlet and outlet openings, baffles arranged in said chamber so that the fuel, in flowing from the inlet to the outlet openings, is directed into contact with all of said heat conducting elements, a casing surrounding said vaporizing chamber and means for passing exhaust gases from the engine through said casing in heat interchanging contact with the walls of said chamber.

7. A fuel heating and vaporizing system for internal combustion engines comprising a fuel vaporizing chamber provided with a bottom inlet for the admission of fuel and a top outlet through which the fuel is passed to the intake manifold, an internal heat conducting flue extending across said chamber between the inlet and outlet openings and having its opposite ends secured to opposite walls of the chamber in line with openings formed in said walls, a plurality of heat conducting elements extending across said chamber, baffles arranged in said chamber so that the fuel, in flowing from the inlet to the outlet openings, is directed into contact with all of said heat conducting elements, a casing surrounding said intake manifold and provided with gas inlet and gas outlet openings and a second casing enclosing said vaporizing chamber, said second casing being provided with an inlet connected to the exhaust manifold and an outlet connected to the gas inlet of the first mentioned casing, said second casing being also internally partitioned so that the exhaust gas, in flowing from the inlet to the outlet of said casing, is passed and re-passed around the vaporizing chamber.

8. A fuel heating and vaporizing system for internal combustion engines comprising a fuel vaporizing chamber provided with fuel inlet and outlet pipes, the inner end of the inlet pipe being slit to provide a plurality of integral tongue extensions which are bent inwardly to extend toward the outer end of said pipe, a plurality of heat conducting elements contained in said chamber, a central post-forming element arranged in the inner end of said inlet pipe to cooperate with said tongue extensions, said post forming element being secured to one of said heat conducting elements, an outer casing enclosing said vaporizing chamber and means for passing exhaust gases through said casing.

9. A fuel heating and vaporizing system for internal combustion engines comprising a fuel vaporizing chamber through which the fuel is passed to the intake manifold of the engine, a casing enclosing said chamber, means for passing exhaust gases through said casing in heat interchanging contact with the walls of said chamber and a flue through which a portion of the gases supplied to said casing are conducted through the fuel vaporizing space of said chamber, said flue being located between and in direct line with fuel inlet and outlet openings formed in said chamber.

10. A fuel heating and vaporizing chamber for internal combustion engines comprising a fuel vaporizing chamber through which the fuel is passed to the intake manifold of the engine, a multiplicity of heat conducting elements extending across the fuel vaporizing space of said chamber and serving to conduct heat from the walls of said chamber, a casing enclosing said chamber, means for passing exhaust gases through said casing in heat interchanging contact with the walls of said chamber and a flue through which a portion of the gases supplied to said casing are conducted through the fuel vaporizing space of said chamber.

ARTHUR FINESTONE.